UNITED STATES PATENT OFFICE.

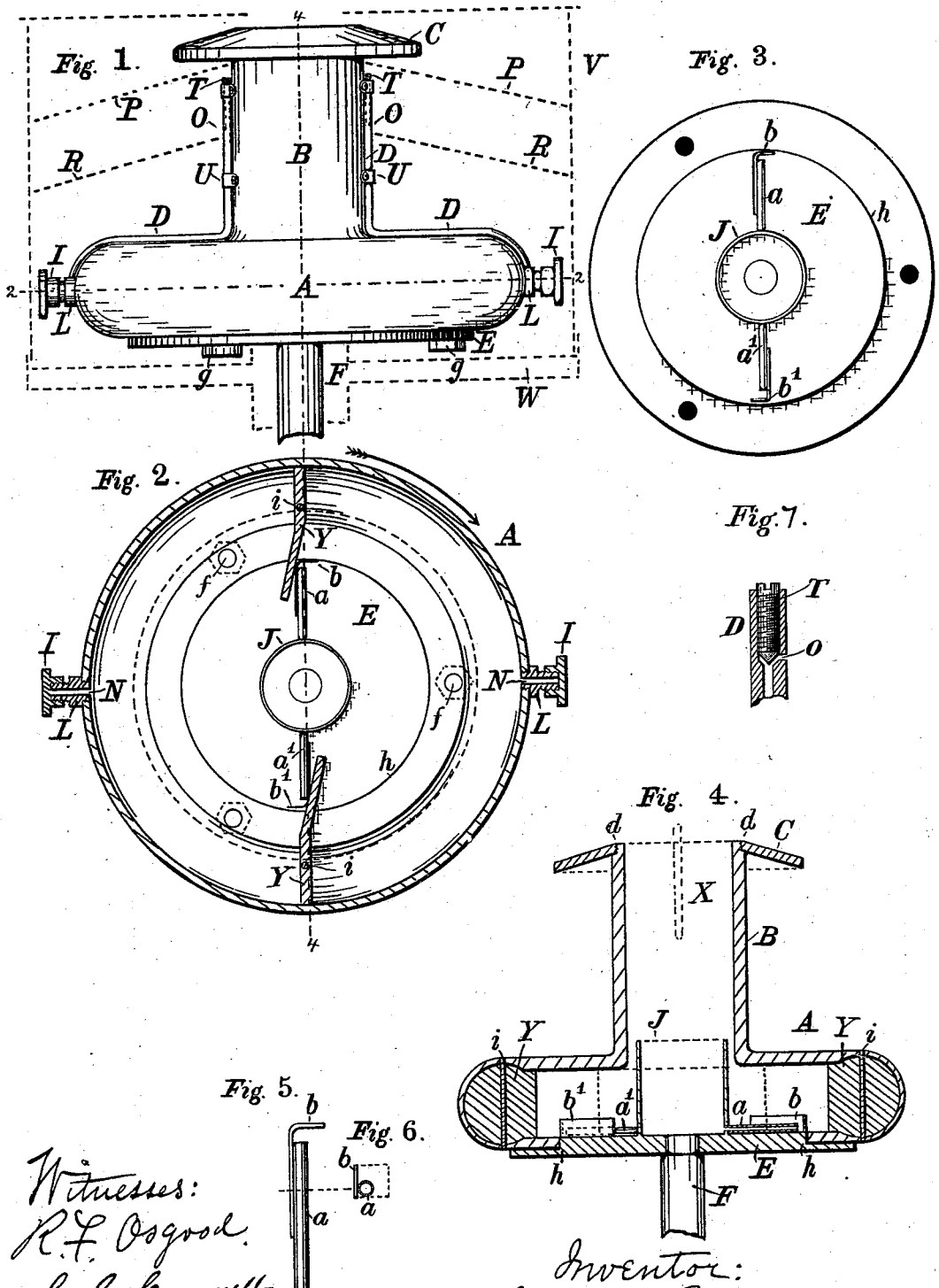

JOHN J. BERRIGAN, OF AVON, NEW YORK.

CENTRIFUGAL CREAMER.

SPECIFICATION forming part of Letters Patent No. 501,040, dated July 4, 1893.

Application filed February 24, 1893. Serial No. 463,528. (No model.)

*To all whom it may concern:*

Be it known that I, JOHN J. BERRIGAN, a citizen of the United States, residing at Avon, in the county of Livingston, in the State of New York, have invented certain Improvements in Centrifugal Creamers, of which the following is a specification, reference being had to the accompanying drawings.

My present invention relates to certain improvements on the centrifugal creamers described in my application for patent, Serial No. 444,047, filed August 25, 1892, which improvements are fully described and illustrated in the following specification and the accompanying drawings,—the novel features thereof being specified in the claims annexed to the said specification.

My improvements in centrifugal creamers are represented in the accompanying drawings, in which—

Figure 1 is a side elevation of the bowl. Fig. 2 is a horizontal section on the line 2—2, Fig. 1, showing the parts below said line. Fig. 3 is a plan view of the bottom plate. Fig. 4 is a vertical section on the line 4—4, Figs. 1 and 2. Fig. 5 represents the milk-pipe and deflector detached. Fig. 6 is a section of the same. Fig. 7 is a sectional view representing the outlet valve.

In the accompanying drawings, A represents the bowl, provided with the neck B.

C is the rim or cone at the upper end of the neck, D the milk-discharge pipes, E the bottom-plate, and F the shaft which supports the bowl.

In the operation of the apparatus, the milk is fed into the cup J inside the neck B by the pipe X, Fig. 4, and passes from such cup through the tubes $a$ $a'$, provided with the deflectors $b$ $b'$,—the skim-milk being discharged through the orifices O, Fig. 1, in the discharge pipes D onto the cover R, and the cream delivered from the outer edge of the flange C onto the cover P. Provision is made for conveying the skim-milk and the cream from the collectors P and R, through suitable pipes to any suitable receptacles. The bowl is supported by a plate W sustained by a suitable frame. A case V surrounds the bowl when in operation,—it being so made that the covers or collectors P and R may be readily removed. The flange or cone C is attached to the upper end of the neck B by a screw-thread, or other suitable device, as indicated at $d$, Fig. 4, so that it can be taken off when it is desired to remove the covers. The bowl is attached to the bottom-plate E by the studs $f$, having nuts $g$ on their lower ends. The plate E is shouldered at $h$, Fig. 4,—the opening in the lower part of the bowl being made of a corresponding diameter,—so that the bowl is always properly centered on the plate.

From the sectional view, Fig. 4, it will be seen that the bowl is formed with an annular contracted portion immediately outside of and surrounding the neck, and that outside of such portion, there is an annular enlarged space, crossed by one or more radial wings or division-plates Y, which also extend inward over the edge of the bottom plate at the shoulder $h$. The wings are secured in place by pins or screws $i$ inserted from the outside of the bowl. They may be bent slightly so that their outer portions are radial while their inner portions pass by the outer ends of the tubes $a$ $a'$ and the deflectors $b$ $b'$.

The cup J is preferably formed in one piece with the bottom-plate. The tube $a$ communicates with the lower portion of the cup,—being shown in section on the right hand side of Fig. 4. It extends outward beyond the inner end of the wing W, being provided at its outer end with the deflector $b$, which operates to retard the discharge of milk through the tube, and to prevent its being thrown in a stream against the outer wall of the bowl. The deflector $b$ is made of a piece of sheet metal secured to one side of the tube $a$, and extending a short distance outside of its outer end, where it is bent at an angle across the central line of the tube. The tube and deflector are soldered in place. The deflector is preferably made somewhat wider than the diameter of the tube. The deflector may however be made in any other suitable way,— such for instance as a projection cast on the bottom plate.

The pipe D communicates with the opening N, Fig. 2, in the boss L secured to the outside of the bowl.

I is a screw-cap, by the removal of which access may be had to the passage $N_1$ for the purpose of cleaning it. The pipe D extends inward along the upper surface of the bowl, and thence upward along the side of the neck B, being secured in place by the clips U. The orifice O, through which the skim-milk is discharged onto the cover R, is regulated in size by a screw-valve T, threaded into the upper end of the pipe D, and extending downward to the opening. In machines of the larger sizes, an additional regulating valve may be employed in the boss L. In the drawings, I have represented two discharge pipes D, one on each side of the bowl and neck. For the smaller sizes of separators a single pipe will suffice,—the tube a, deflector and wing Y being in this case placed diametrically opposite the discharge pipe.

I prefer to make the bowl, flange and bottom-plate of my improved separator of aluminum. The wings are also cast in the bowl, when two are used, but in case one is employed, I prefer to insert it separately, as I am thereby enabled to adjust its weight to balance that of the discharge pipe on the opposite side of the bowl.

My improved cream-separator is cheap to construct, and very efficient in practical operation. In trials made with it, there is practically no fat left in the skim-milk. The aluminum does not corrode, and its lightness reduces the power necessary to run the bowl. The construction is such moreover that satisfactory results are secured at speeds slower than are ordinarily employed in such machines. The bowl is also easy to keep clean, as the bottom plate can be readily removed.

I claim—

In a centrifugal creamer, the combination with the revolving bowl A, provided with the upwardly extending neck B, having removable delivery flange C at its upper end, and supported by the plate E and shaft F, of the exterior milk-pipe D, extending along the outside of the bowl and the neck, and provided with means for regulating the discharge of milk therethrough, substantially as described.

JOHN J. BERRIGAN.

Witnesses:
GEO. B. SELDEN,
C. G. CRANNELL.